United States Patent [19]

Kan-O et al.

[11] Patent Number: 5,503,361
[45] Date of Patent: Apr. 2, 1996

[54] ADJUSTABLE STAND DEVICE

[75] Inventors: Toshiaki Kan-O; Masashi Odagiri, both of Yamagata, Japan

[73] Assignee: NEC Corporation, Japan

[21] Appl. No.: 229,157

[22] Filed: Apr. 18, 1994

[30] Foreign Application Priority Data

Apr. 26, 1993 [JP] Japan ................................. 5-098290

[51] Int. Cl.6 ...................................................... F16F 15/00
[52] U.S. Cl. ........................... 248/688; 248/456; 248/918
[58] Field of Search ....................... 248/166, 455, 248/456, 397, 917, 923, 918, 688

[56] References Cited

U.S. PATENT DOCUMENTS 2,046,010  6/1936  Wright ..................................... 248/456
4,113,212  9/1978  Coriden ................................... 248/455
5,141,196  8/1992  Arnold ................................ 248/456 X

FOREIGN PATENT DOCUMENTS 191140  1/1964  Sweden ................................. 248/456

*Primary Examiner*—Alvin C. Chin-Shue
*Attorney, Agent, or Firm*—Laff, Whitesel, Conte & Saret, Ltd.

[57] ABSTRACT

An adjustable stand device for mounting a personal computer of the notebook or pen-input type having a folding display device wherein said display device is pushed by a pen when data is inputted thereinto comprises: a base 1 for fixing the rear side of said display device by means of a screw; a backboard 2 which can be rotated to an optional angle on a fulcrum 12 which is provided on the end of said base 1; and an angle adjustment mechanism for setting an angle between said base 1 and said backboard 2.

2 Claims, 4 Drawing Sheets

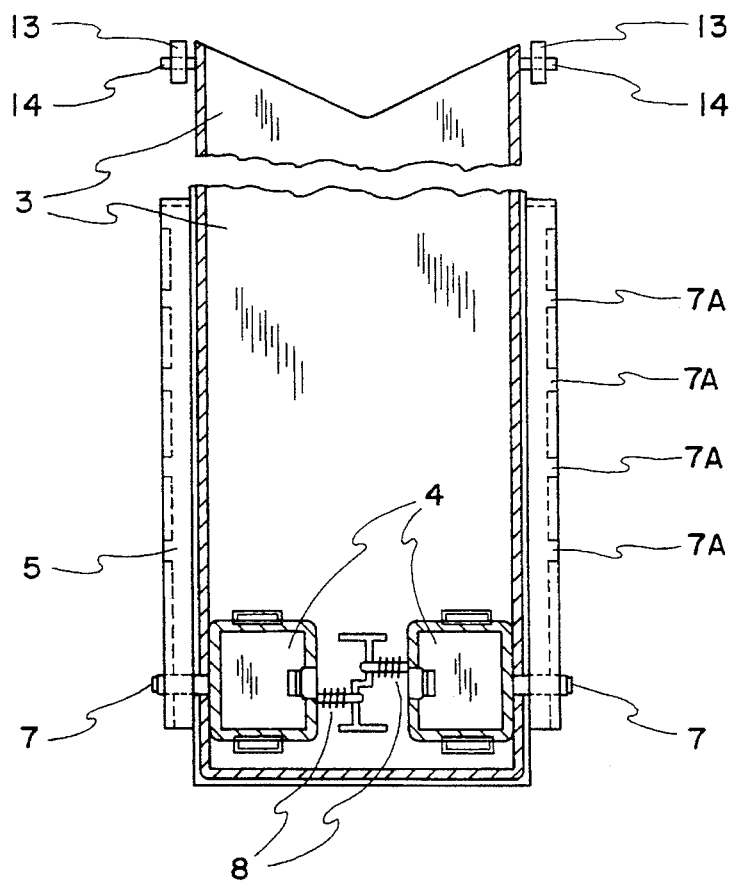
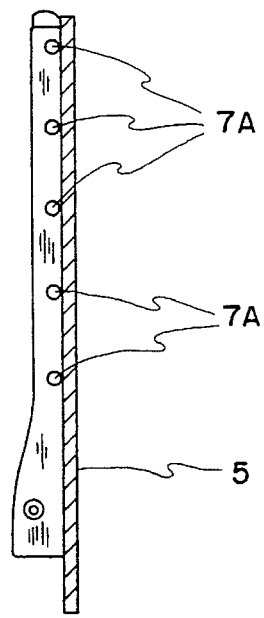
FIG. 3A  FIG. 3B
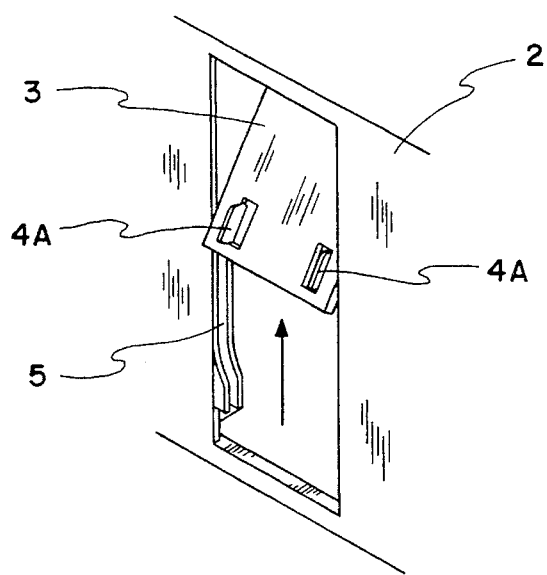
FIG. 3C

ADJUSTABLE STAND DEVICE

BACKGROUND OF THE INVENTION

1. Field of the Invention

The present invention relates to a stand device suitable for mounting a notebook type personal computer, a pen input type personal computer or the like, particularly to an adjustable stand device which is reformed to mount a personal computer in such a manner that a display device is fixedly held by means of an angle adjustment mechanism so as to be easily seen.

2. Description of the Prior Art

A conventional notebook type personal computer (hereinafter referred to as a personal computer) has a structure such that a leg is provided to raise the rear of the personal computer where a display is provided to a certain extent when the personal computer is directly placed on a desk or on a flat stand and used. The personal computer, when it is used, is placed on the stand and its display device is opened and tilted, and a tilt angle of the display device is determined by adjusting the tilt angle thereof.

Since the above conventional stand device has a simple structure in which the personal computer is merely placed on the stand with its tilt angle fixed, the stand device and the personal computer are brought into an unstable state, thereby causing sliding therebetween. Particularly, when the display device is pushed by a pen, for example, for inputting data, there is a possibility that the display device will be turned back. Thus the conventional stand device has a drawback in the handling thereof.

SUMMARY OF THE INVENTION

An object of the present invention is to provide an adjustable stand device which can fix a display device of a personal computer and at the same time can adjust the tilt angle of the display device to a desired value.

An adjustable stand device of the present invention for mounting a personal computer of the notebook or pen-input type which has a folding display device which is pushed by a pen when data is inputted thereinto comprises: a base for fixing the rear side of the display device by means of a screw; a backboard which can be turned around the end of the base, which serves as a fulcrum, to an optional angle; and an angle adjustment mechanism for setting an angle between the base and the backboard.

A perspective view of an embodiment of the present invention.

FIG. 2.

Figure 1:
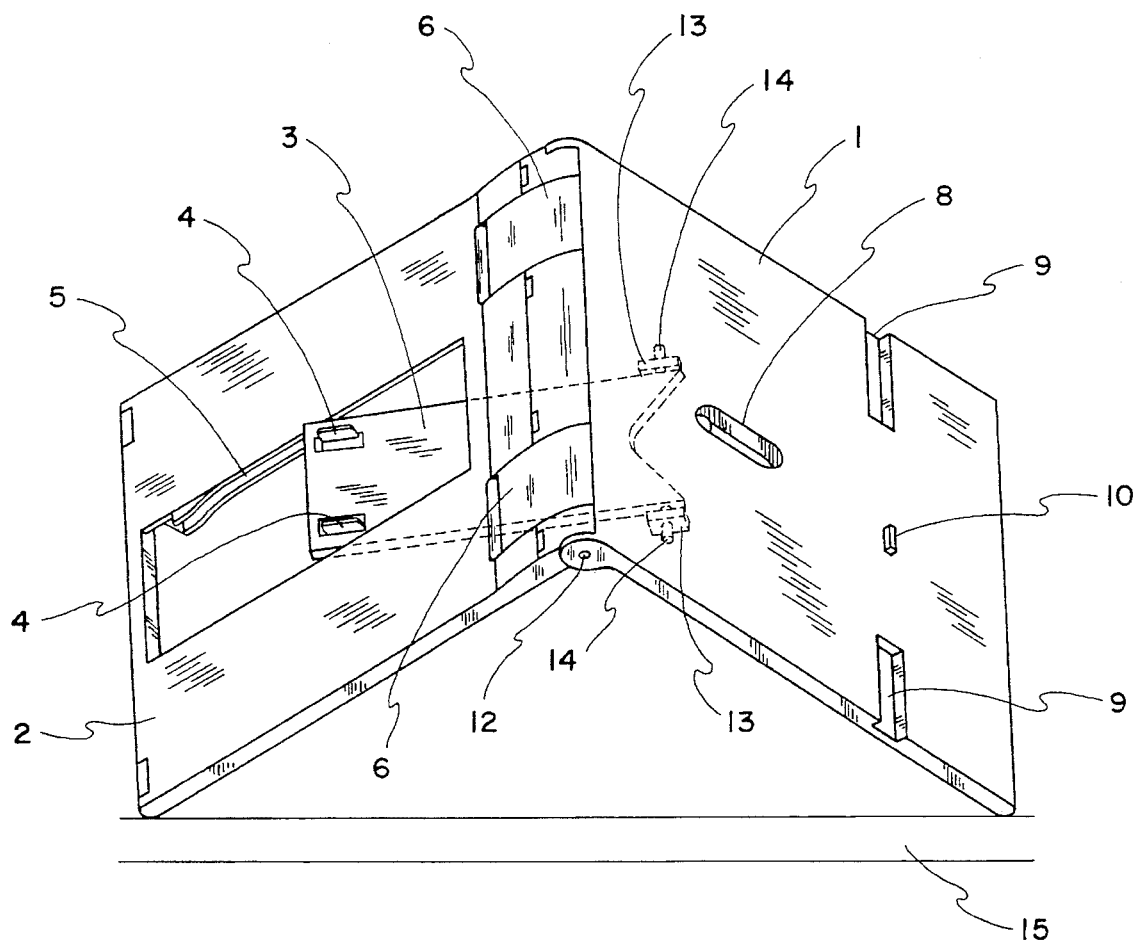
FIG. 1.

A perspective view of the stand device of FIG. 1 when not in use.

FIGS. 3A, 3B, and 3C.

Diagrams illustrating the function of a stay of the present embodiment.

Figure 4A:
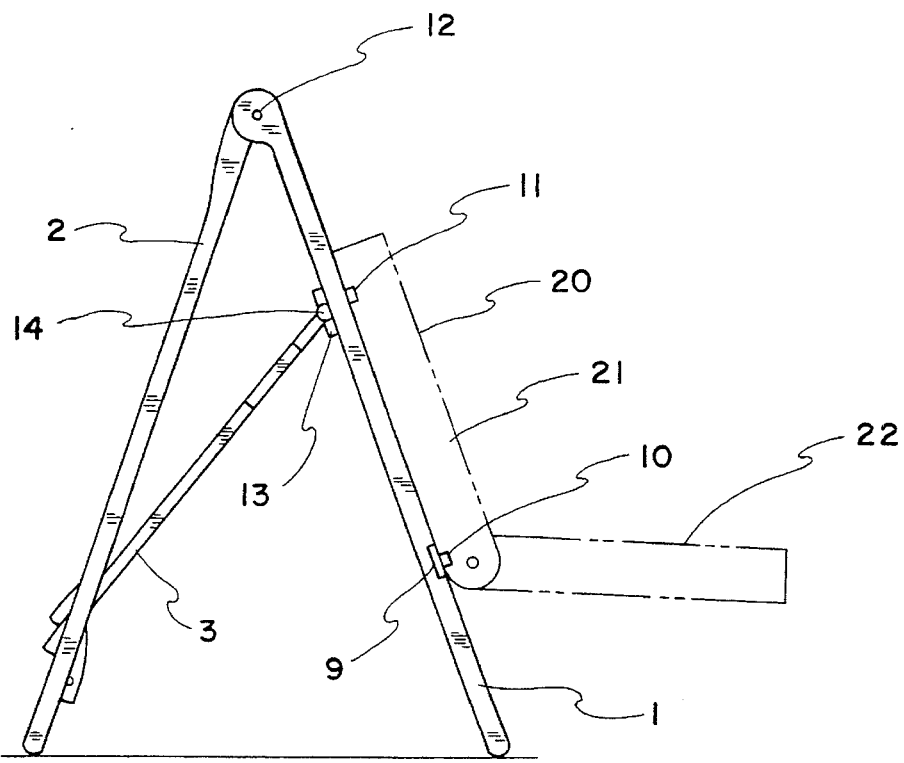
Figure 4B:
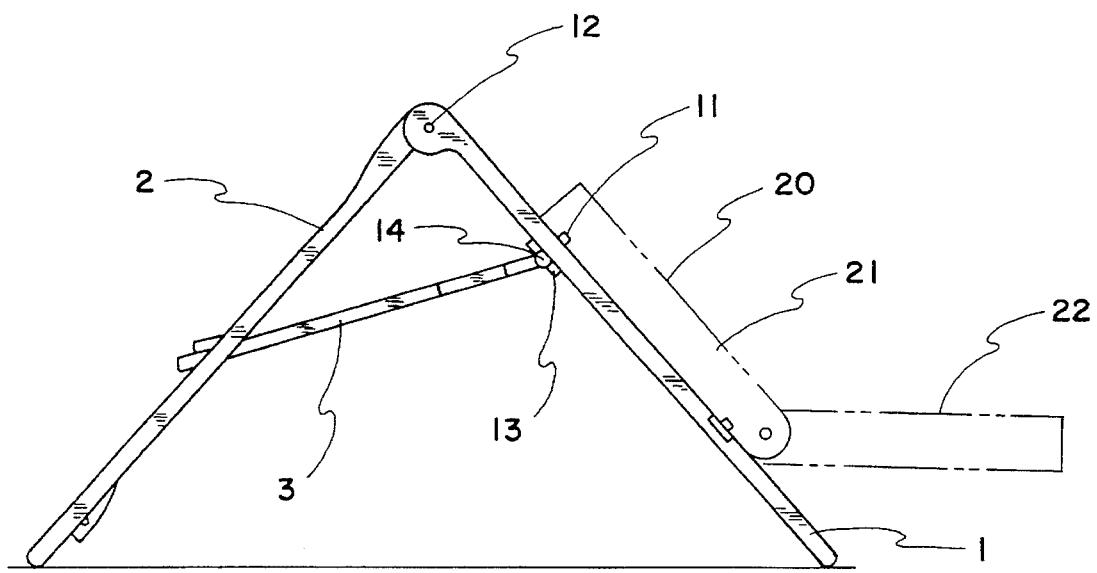

FIGS. 4A and 4B.

A schematic view in which the stand device of FIG. 1 is used.

FIG. 5.

A schematic view in which the stand device of FIG. 1 is used.

DETAILED DESCRIPTION OF THE PREFERRED EMBODIMENT

The present invention will now be described with reference to the drawings.

Figure 2:
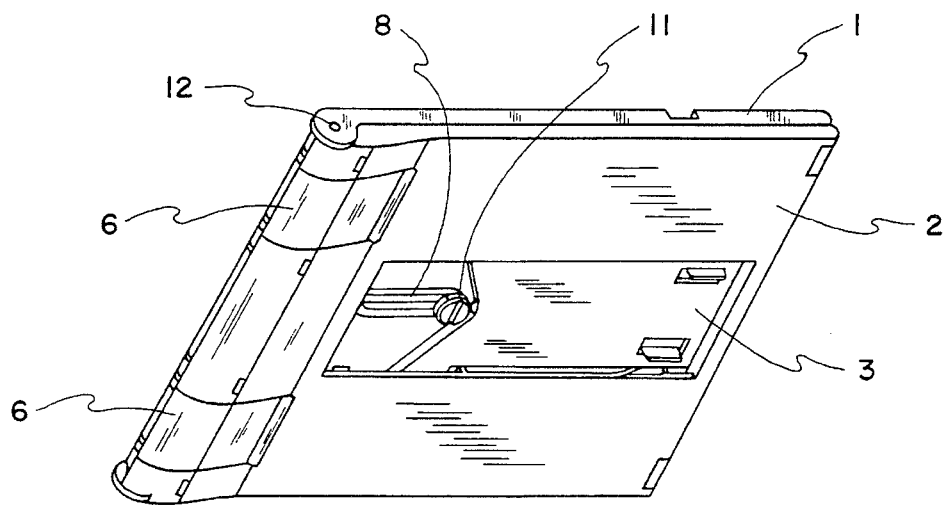
Figure 5:
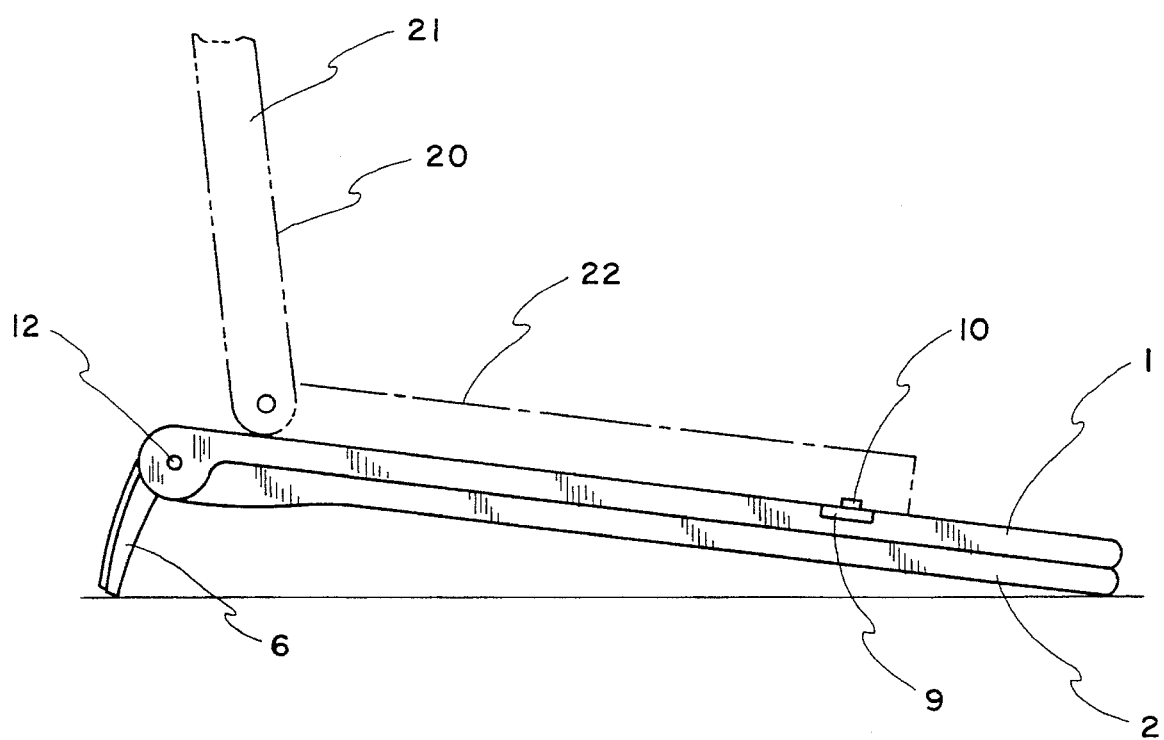

The embodiment of FIG. 1 comprises a base 1 for fixing the rear side of a display device of a personal computer; a backboard 2 which can be opened at an optionally selected angle on a hinge 12 serving as an axis of rotation and which supports the base 1 on a desk 15, forming a triangular shape therebetween; a stay 3 having an angle adjustment mechanism for setting the inclination of the base 1 at a predetermined angle with respect to the desk 15; rails 5 for guiding the stay 3 to a predetermined position by causing the stay 3 to slide through slide locks 4 (later described); coupling pins 14 for rotatably mounting one end of the stay 3 to locking brackets 13 fixed on the base 1, and a set screw 11 adapted to be screwed into a female screw provided on the rear side of the display of the personal computer from the rear side of the base 1 through an opening 8 of the base 1 as shown in FIG. 2 and FIG. 1. It is to be noted that grooves 9 and a projection 10 are provided on the surface of the base 1 to temporarily set the body of personal computer by engagement respectively with, for example, a rubber leg and a recess provided on the rear side of the display device. Further, the surface of tilting feet 6 are brought to the same level as the surface of the backboard 2 when the stand device is closed as shown in FIG. 2 and the feet 6 turn on the hinge 12 in association with the opening action of the base 1 and the backboard 2. As illustrated in FIG. 5, the tilt feet 6 function as fixed feet.

Sectional views shown in FIGS. 3A–3C illustrate the manner in which the slide locks 4 of the stay 3 slide along the rails 5, being guided thereby. It is arranged such that each nail 7 is pressed by a spring 8 mounted to each of the slide locks 4 against the inner side of the rail 5 so that the nail 7 is brought into engagement with one of nail holes 7a provided through the rail to form desired angles between the base 1 and the backboard 2 to support them. The locking bracket 13 and the coupling pin 14 together constitute a fulcrum for rotation of the stay 3 as described above. In order to reset the angles between the base 1 and the backboard 2, knobs 4A shown in FIG. 3 (c) are manually pressed to pull out the nails 7 from the nail holes 7A.

FIGS. 4A and 4B illustrate the manner in which the base 1 and the backboard 2 are set on the desk so as to form different angles therebetween, in which, since the rear side of the display device 21 of the personal computer 20 is set on the base 1 by a set screw 11, the device 21 is prevented from slipping down. Therefore, even when a pen for inputting data is pressed against the display device 21, inputting operation of the pen can be performed without fail. FIG. 5 illustrates the manner in which the stand device is folded as illustrated in FIG. 2 and the feet 6 are opened outward. Under such conditions, inputting operation is performed by using keys instead of a pen.

As described above, according to the present invention, since the display device of personal computer of the note or pen-inputting type can be set by optionally adjusting the angle of inclination of the stand device, inputting operation by the use of keys and pen can be performed with ease. The display device can be oriented so as to be easily seen. Further, the stand device is folded when not in use, thereby enabling the personal computer mounted on the folded stand to be carried by users.

What is claimed is:

1. An adjustable stand device for mounting a personal computer of the notebook or a pen-input type having a folding display device, wherein said display device is pushed by means of a pen when data is inputted thereinto, said stand comprising:

a base for fixing the rear side of said display device by means of a screw;

a backboard which can be turned about one edge of said base through optional angles;

an angle adjustment mechanism for setting the angle between said base and said backboard; and tilt feet which rotate from a closed position through a predetermined angle to an open position, said rotation being about a joint part between the base and the backboard, the tilt feet being used when in said open position as legs while said base and backboard are in a folded state.

2. The adjustable stand device according to claim 1, wherein said angle adjustment mechanism comprises:

a pair of rails disposed on the inner side of said backboard each having a plurality of holes for receiving a nail;

a stay which is rotatably mounted to the rear side of said base and has a pair of nails each of which slides along said rail being guided thereby and locked at positions where said holes for the nails are provided.

* * * * *